US011444666B2

(12) United States Patent
Petersson et al.

(10) Patent No.: US 11,444,666 B2
(45) Date of Patent: *Sep. 13, 2022

(54) CHANNEL CONDITION ESTIMATION

(71) Applicant: Telefonaktiebolaget LM Ericsson (publ), Stockholm (SE)

(72) Inventors: Sven Petersson, Sävedalen (SE); Fredrik Athley, Kullavik (SE); Mikael Coldrey, Borås (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,555

(22) Filed: Jul. 17, 2020

(65) Prior Publication Data

US 2021/0075481 A1 Mar. 11, 2021

Related U.S. Application Data

(63) Continuation of application No. 15/325,846, filed as application No. PCT/EP2016/082720 on Dec. 27, 2016, now Pat. No. 10,720,976.

(51) Int. Cl.
*H04B 7/0456* (2017.01)
*H04B 7/06* (2006.01)
*H04L 25/02* (2006.01)

(52) U.S. Cl.
CPC ......... *H04B 7/0469* (2013.01); *H04B 7/0617* (2013.01); *H04L 25/0204* (2013.01)

(58) Field of Classification Search
CPC ... H04B 7/04; H04B 7/06; H04B 7/08; H04B 7/0469; H04B 7/0617; H04J 1/02;
(Continued)

(56) References Cited

U.S. PATENT DOCUMENTS 8,181,076 B2 5/2012 Lou et al.
8,502,733 B1 8/2013 Negus et al.
(Continued)

FOREIGN PATENT DOCUMENTS

CN 103703695 A 4/2014
CN 104303477 A 1/2015

OTHER PUBLICATIONS

International Search Report and Written Opinion issued in Application No. PCT/EP2016/082720 dated Aug. 24, 2017, 14 pages.
(Continued)

*Primary Examiner* — Shawkat M Ali
(74) *Attorney, Agent, or Firm* — Rothwell, Figg, Ernst & Manbeck, P.C.

(57) ABSTRACT

There is provided mechanisms for obtaining channel conditions per antenna element, A method is performed by a wireless radio transceiver device comprising N antenna elements in an antenna array with analog beamforming and being configured to communicate using beams. The method comprises obtaining, for a stationary radio propagation channel, channel conditions for signals received by the wireless radio transceiver device in M beams, where M>1. The method comprises transforming the channel conditions for the M beams to channel conditions for the N antenna elements by using a relation based on beamforming weights that map the N antenna elements to the M beams.

19 Claims, 4 Drawing Sheets

(58) Field of Classification Search
CPC ... H04J 3/02; H04L 5/00; H04L 25/02; H04L 25/0204; H04L 27/00; H04L 27/26; H01Q 1/24; H01Q 3/26; H01Q 3/40; H04W 16/28; H04W 24/08; H04W 72/04; H04W 72/08
USPC .................. 370/252, 281, 329; 375/224, 316
See application file for complete search history.

(56) References Cited

U.S. PATENT DOCUMENTS

| | | |
|---|---|---|
| 10,720,976 B2* | 7/2020 | Petersson ............. H04B 7/0617 |
| 2009/0168912 A1 | 7/2009 | Li et al. |
| 2010/0251038 A1 | 9/2010 | Oyama |
| 2012/0033761 A1 | 2/2012 | Guo et al. |
| 2013/0044683 A1 | 2/2013 | Maltsev et al. |
| 2013/0090071 A1 | 4/2013 | Abraham et al. |
| 2013/0301454 A1 | 11/2013 | Seol et al. |
| 2015/0358132 A1 | 12/2015 | Wallen et al. |
| 2016/0197709 A1 | 7/2016 | Shen et al. |
| 2016/0359596 A1 | 12/2016 | Wild |
| 2016/0373178 A1 | 12/2016 | Nam et al. |

OTHER PUBLICATIONS

Taillefer, E. et al.: "Enhanced Reactance-Domain ESPRIT Algorithm Employing Multiple Beams and Translational-Invariance Soft Selection for Direction-of-Arrival Estimation in the Full Azimuth" IEEE Transactions on Antennas and Propagation, IEEE Service Center, Piscataway, NJ, US, vol. 56, No. 8, Aug. 2008, XP011232515, ISSN: 0018-926X, pp. 2514-2526.

* cited by examiner

CHANNEL CONDITION ESTIMATION

CROSS-REFERENCE TO RELATED APPLICATIONS

This application is a continuation of U.S. application Ser. No. 15/325,846, filed Jan. 12, 2017, which is a 35 U.S.C. § 371 National Stage of International Patent Application No. PCT/EP2016/082720, filed Dec. 27, 2016, designating the United States. The above identified applications are incorporated by this reference.

TECHNICAL FIELD

Embodiments presented herein relate to a method, a radio transceiver device, a computer program, and a computer program product for obtaining channel conditions per antenna element of the radio transceiver device.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, such low frequency bands could be needed to achieve sufficient network coverage for wireless radio transceiver devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless radio transceiver devices might be required to reach a sufficient link budget.

The wireless radio transceiver devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless radio transceiver devices, different implementations will be needed.

Different antenna architectures for different frequency bands are being discussed for wireless radio transceiver devices. At high frequency bands (e.g. above 15 GHz) something called "panels" are being discussed. These panels may be uniform linear/rectangular arrays (ULAs/URAs), for example steered by using analog phase shifters. In order to get coverage from different directions, multiple panels can be mounted on different sides of the wireless radio transceiver devices.

Even though wireless radio transceiver devices may be stationary, and experience a fairly stationary radio propagation channel it might be challenging for a wireless radio transceiver device applying analog or hybrid beamforming to find the optimal (or close to optimal) phase settings per antenna element in order to maximize some metrics (for example user throughput) due to lack of sufficient channel state information and too many possible phase settings.

Hence, there is still a need for improved channel condition estimation.

SUMMARY

An object of embodiments herein is to provide channel condition estimation per antenna element.

According to a first aspect there is presented a method for obtaining channel conditions per antenna element. The method is performed by a wireless radio transceiver device comprising N antenna elements in an antenna array with analog beamforming and being configured to communicate using beams. The method comprises obtaining, for a stationary radio propagation channel, channel conditions for signals received by the wireless radio transceiver device in M beams, where M>1. The method comprises transforming the channel conditions for the M beams to channel conditions for the N antenna elements by using a relation based on beamforming weights that map the N antenna elements to the M beams.

Advantageously this provides efficient estimation of channel conditions per antenna element even though only channel conditions for the beams are available.

Advantageously this enables estimation of channel conditions in the antenna element space despite the use of analog or hybrid beamforming.

Advantageously this enhances the performance for a wireless radio transceiver device using analog or hybrid beamforming in case of stationary radio propagation channels.

According to a second aspect there is presented a radio transceiver device for obtaining channel conditions per antenna element. The radio transceiver device comprises N antenna elements in an antenna array with analog beamforming and is configured to communicate using beams. The radio transceiver device further comprises processing circuitry. The processing circuitry is configured to cause the radio transceiver device to obtain, for a stationary radio propagation channel, channel conditions for signals received by the wireless radio transceiver device in M beams, where M>1. The processing circuitry is configured to cause the radio transceiver device to transform the channel conditions for the M beams to channel conditions for the N antenna elements by using a relation based on beamforming weights that map the N antenna elements to the M beams.

According to a third aspect there is presented radio transceiver device for obtaining channel conditions per antenna element. The radio transceiver device comprises N antenna elements in an antenna array with analog beamforming and is configured to communicate using beams. The radio transceiver device further comprises processing circuitry and a storage medium. The storage medium stores instructions that, when executed by the processing circuitry, cause the radio transceiver device to perform operations, or steps. The operations, or steps, cause the radio transceiver device to obtain, for a stationary radio propagation channel, channel conditions for signals received by the wireless radio transceiver device in M beams, where M>1. The operations, or steps, cause the radio transceiver device to transform the channel conditions for the M beams to channel conditions for the N antenna elements by using a relation based on beamforming weights that map the N antenna elements to the M beams.

According to a fourth aspect there is presented a radio transceiver device for obtaining channel conditions per antenna element. The radio transceiver device comprises N antenna elements in an antenna array with analog beamforming and is configured to communicate using beams. The radio transceiver device further comprises an obtain module configured to obtain, for a stationary radio propagation channel, channel conditions for signals received by the wireless radio transceiver device in M beams, where M>1. The radio transceiver device further comprises a transform module transform the channel conditions for the M beams to channel conditions for the N antenna elements by using a relation based on beamforming weights that map the N antenna elements to the M beams.

According to a fifth aspect there is presented a computer program for obtaining channel conditions per antenna element, the computer program comprising computer program code which, when run on a radio transceiver device comprising N antenna elements in an antenna array with analog beamforming and being configured to communicate using beams, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
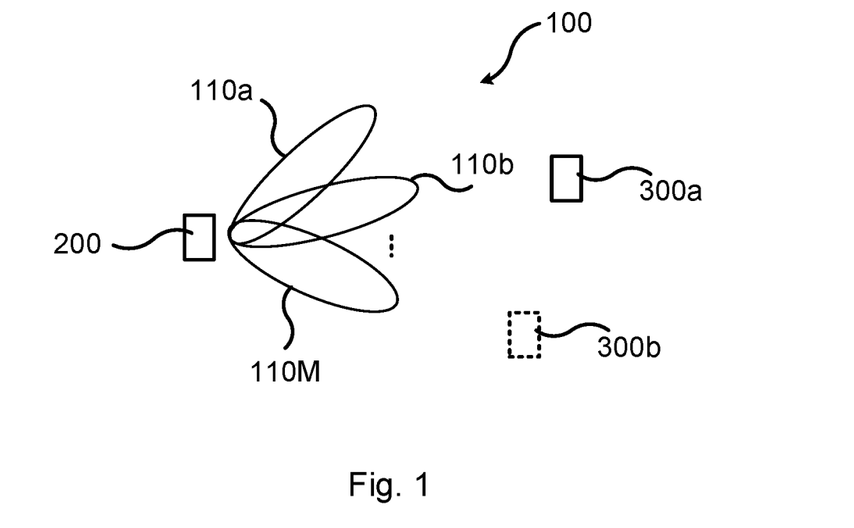
FIG. 1 is a schematic diagram illustrating a communications network according to embodiments.

FIG. 1 is a schematic diagram illustrating a communications network 100 comprising an access node 300a providing network access to a wireless radio transceiver device 200, and, optionally, at least one further access node 300b. The wireless radio transceiver device 200 is assumed to comprise at least one receiver chain and is configured to receive signals from the access node 300a in M beams 110a, 110b, . . . , 110M. The wireless radio transceiver device 200 is thus configured to communicate in M beams 110a, 110b, . . . , 110M (in contrast to omnidirectional beams).

The access node 300a, 300b could be any of a radio access network node, radio base station, base transceiver station, node B, evolved node B, g node B, or access point. The wireless radio transceiver device 200 could be any of a wireless device, mobile station, mobile phone, handset, wireless local loop phone, user equipment (UE), smartphone, laptop computer, tablet computer, wireless sensor, or another radio access network node e.g. for providing wireless backhaul.

Figure 2:
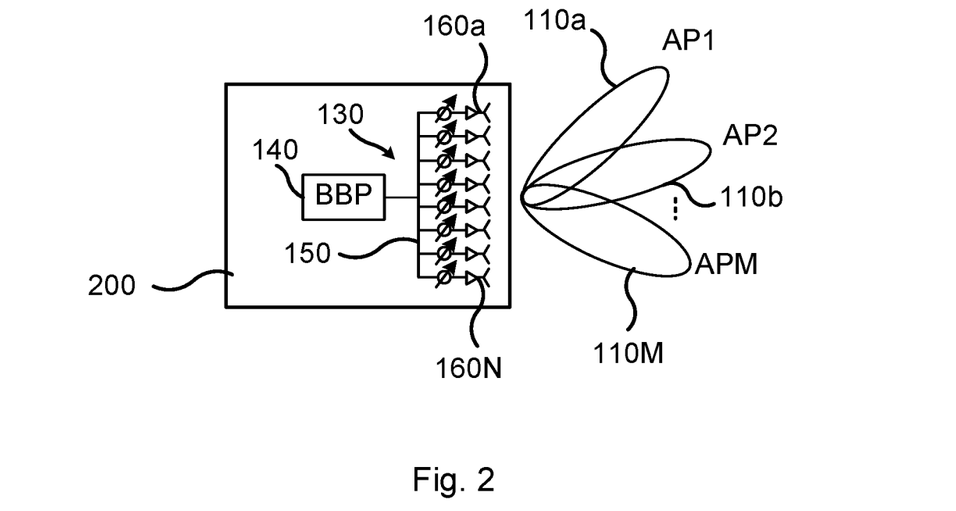
FIG. 2 schematically illustrates a wireless radio transceiver device according to an embodiment.

FIG. 2 illustrates the wireless radio transceiver device 200 according to an embodiment. The wireless radio transceiver device 200 is equipped at least one receiver chain 130, each comprising its own baseband processing (BBP) chain 140. Each baseband processing chain 140 is operatively connected to its own analog beamformer 150. Each analog beamformer 150 has its own set of analog precoder weights (e.g. defined by a codebook) by means of which the M different directional beams 110a, 110b, . . . , 110M can be formed. Hence, in the illustrative example of FIG. 2, the analog beamformer 150 switches between M analog precoders; AP1 for generating beam 110a, AP2 for generating beam 110b, and APM for generating beam 110M.

The radio transceiver device 200 further comprises N antenna elements, two of which are identified at reference numerals 160a, . . . , 160N. The phase and gain for each of the N antenna elements 160a, . . . , 160N could be individually controlled by a phase and/or gain control function. For example, according to the illustrative example of FIG. 2, each of the N antenna elements 160a, . . . , 160N could have its own phase shifter and amplitude taper, although it could be enough to just have phase shifters for N−1 of the N antenna elements. The antenna elements 160a, . . . , 160N at the wireless radio transceiver device 200 might be implemented in an irregular fashion and the physical structure of the wireless radio transceiver device 200 might affect the radiation patterns of the antenna elements 160a, . . . , 160N.

The embodiments disclosed herein relate to mechanisms for obtaining channel conditions per antenna element of the wireless radio transceiver device 200. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 3:
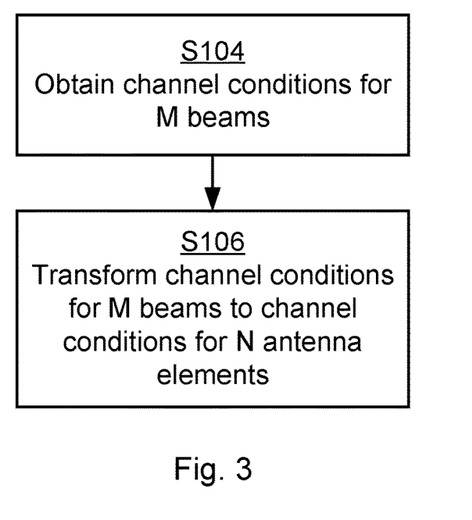
FIGS. 3, 4, and 5 are flowcharts of methods according to embodiments.
Figure 4:
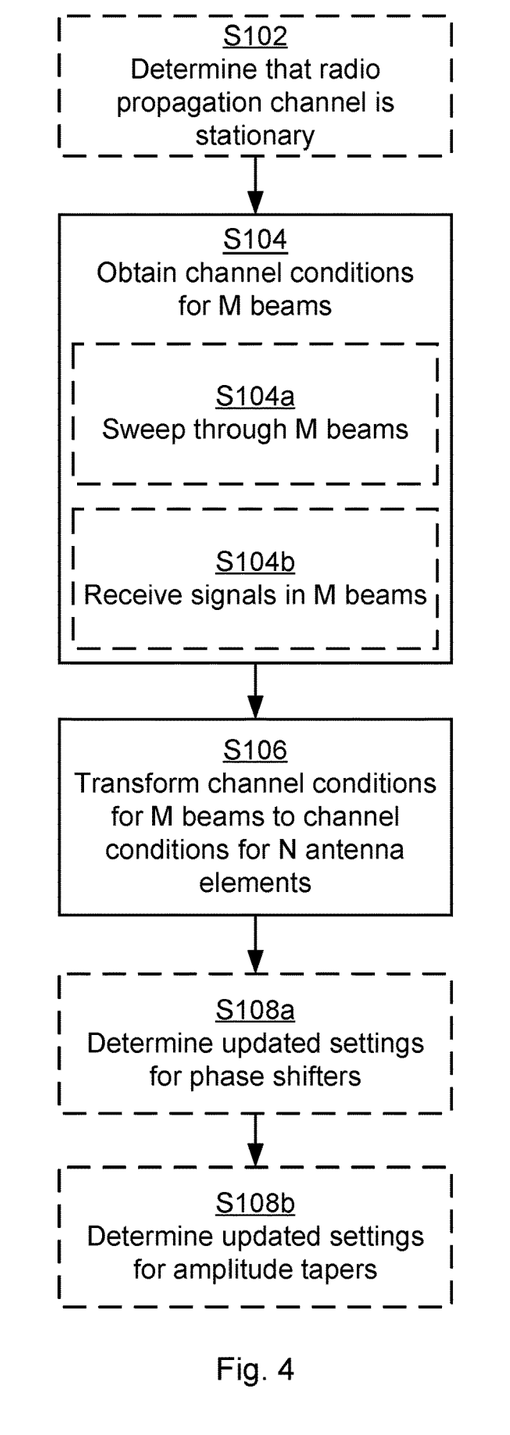

FIGS. 3 and 4 are flow charts illustrating embodiments of methods for obtaining channel conditions per antenna element of the wireless radio transceiver device 200. The methods are performed by the radio transceiver device 200. The methods are advantageously provided as computer programs 1020 (as in FIG. 10).

Reference is now made to FIG. 3 illustrating a method for obtaining channel conditions per antenna element of the wireless radio transceiver device 200 as performed by the radio transceiver device 200 according to an embodiment.

The wireless radio transceiver device 200 comprises N antenna elements 160a, ..., 160N in an antenna array with analog beamforming 150 and is configured to communicate using beams 110a, 110b, ..., 110M.

The use of analog beamforming 150 allows channel conditions for signals received by the wireless radio transceiver device 200 in M beams 110a, 110b, ..., 110M to be obtained by the wireless radio transceiver device 200. Hence, the wireless radio transceiver device 200 is configured to perform step S104:

S104: The wireless radio transceiver device 200 obtains, for a stationary radio propagation channel, channel conditions for signals received by the wireless radio transceiver device 200 in M beams 110a, 110b, ..., 110M, where M>1. Examples of how the channel conditions for the signals can be obtained will be disclosed below.

The M beams 110a, 110b, ..., 110M could be non-overlapping or partly overlapping, and generally be directed towards the access node 300a, or at least in directions from which signals from the access node 300a are received by the wireless radio transceiver device 200, or in directions such as to obtain as complete channel conditions of the radio propagation channel as possible.

However, channel conditions for the N antenna elements 160a, ..., 160N can be determined despite the use of analog (or hybrid) beamforming by transforming the channel conditions for the M beams into channel conditions for the N antenna elements. Hence, the wireless radio transceiver device 200 is configured to perform step S106:

S106: The wireless radio transceiver device 200 transforms the channel conditions for the M beams 110a, 110b, ..., 110M to channel conditions for the N antenna elements 160a, ..., 160N by using a relation. The relation is based on beamforming weights that map the N antenna elements 160a, ..., 160N to the M beams 110a, 110b, ..., 110M. Examples of how the relation used in step S106 can be realized will be disclosed below.

Embodiments relating to further details of obtaining channel conditions per antenna element of the wireless radio transceiver device 200 as performed by the radio transceiver device 200 will now be disclosed.

With reference to FIG. 2, the beamforming weights could be regarded as being precoder weights; the terms beamforming weights and precoder weights could thus be used interchangeably.

In some aspects the radio propagation channel is sufficiently static (such as being free from fast fading) when the channel conditions for the M beams 110a, 110b, ..., 110M are obtained. This requires the channel coherence time to be larger or equal to the observation (measurement) time.

Reference is now made to FIG. 4 illustrating methods for obtaining channel conditions per antenna element of the wireless radio transceiver device 200 as performed by the radio transceiver device 200 according to further embodiments. It is assumed that steps S104, S106 are performed as described above with reference to FIG. 3 and a thus repeated description thereof is therefore omitted.

The radio transceiver device 200 could need to verify that the radio propagation channel to the access node 300a is stationary enough. This could for example be achieved by the radio transceiver device 200 performing measurements on the radio propagation channel for some different time samples and evaluating how much the radio propagation channel has changed over time. Hence, according to an embodiment the wireless radio transceiver device 200 is configured to perform step S102:

S102: The wireless radio transceiver device 200 verifies that the radio propagation channel is stationary when obtaining the channel conditions for the M beams 110a, 110b, ..., 110M.

This could for example be supported by using sensors in the radio transceiver device 200 that evaluate if the radio transceiver device 200 is physically stationary.

According to an embodiment, if the radio propagation channel has changed less than some specified value (compared to a certain threshold) the radio propagation channel is assumed to be stationary enough. In another embodiment the radio transceiver device 200 measures and evaluates if the radio propagation channel is stationary enough, for example more stationary than a given threshold.

The radio transceiver device 200 starts sweeping M beams 110a, 110b, ..., 110M (for example beams based on the Discrete Fourier Transform (so-called DFT beams)) and estimates the radio propagation channel for these M beams. The M beams could be created by the radio transceiver device 200 applying phase-only precoders by appropriate settings of the analog phase shifters.

The radio transceiver device 200 may need to sweep M≥N beams in order to attain individual channel estimates for an array with N antenna elements.

When the measurements are done the radio transceiver device 200 can use below Equation (1) and Equation (2) to transform the channel estimates for the M beams to N channel estimates (i.e., one channel estimate for each of the N antenna elements):

$$\hat{c}_b = \begin{bmatrix} \hat{c}_{b1} \\ \hat{c}_{b2} \\ \vdots \end{bmatrix} = [w_1 w_2 \cdots]^H c_{el} = W^H c_{el} \quad (1)$$

$$\hat{c}_{el} = (WW^H)^{-1} W \hat{c}_b \quad (2)$$

In these equations, $X^H$ denotes the Hermitian transpose of matrix X, the parameter $\hat{c}_{bk}$ represents the estimated channel coefficients in the beam space after applying a precoder weight $w_k$ and is found as $\hat{c}_{bk} = w_k^H c_{el}$, where $c_{el}$ is the channel coefficient vector (of dimension N-by-1) in the channel element space, and the parameter $\hat{c}_{el}$ represents the estimated channel coefficients in the antenna element space. The matrix pseudo-inverse $(WW^H)^{-1}W$ is used in Equation (2) to cover the case where M>N. Hence, according to an embodiment the relation used in step S106 is defined by a pseudo-inverse of the precoder weights.

For the case M=N orthogonal beams, as given by orthogonal precoder weights, (for example DFT beams) can (or in some aspects even needs) be used. Hence, according to an embodiment where M=N, the M beams 110a, 110b, ..., 110M are mutually orthogonal with respect to each other.

The channel estimator in Equation (2) is a zero forcing estimator which has good performance at high SNR. Hence, according to an embodiment the relation used in step S106 is defined by a zero-forcing estimator of the channel conditions for the N antenna elements 160a, ..., 160N.

At low SNR, a linear minimum mean square error (LMMSE) estimator could be more suitable. Hence, according to an embodiment the relation used in step S106 is defined by an LMMSE estimator of the channel conditions for the N antenna elements 160a, ..., 160N. For LMMSE the estimated channel coefficients in the antenna element space are given as:

$$\hat{c}_{el} = (R_{el}^{-1} + W R_{nb,nb}^{-1} W^H)^{-1} W R_{nb,nb}^{-1} \hat{c}_b \quad (3)$$

In this equation, $R_{el} = E[c_{el} c_{el}^H]$, where $E[x]$ is the mathematical expectation of x, the parameter $R_{nb,nb}$ is a matrix representing correlation of the noise in the beam space, and $X^{-1}$ denotes the inverse of matrix X. The parameter $R_{el}$ is not invertible unless the channel has full rank. By using the matrix inversion lemma the estimated channel coefficients in the antenna element space for LMMSE can therefore be formulated as:

$$\hat{c}_{el} = \left[ R_{el} - R_{el} \left( R_{el} + (W R_{nb,nb}^{-1} W^H)^{-1} \right)^{-1} R_{el} \right] W R_{nb,nb}^{-1} \hat{c}_b \quad (4)$$

The beam and channel estimation in the radio transceiver device 200 is performed per antenna port at the access node 300a, meaning that the herein disclosed embodiments could be applied in the case with multiple ports at the access node 300a, for example where each port may represent a beam or antenna.

It could be possible to estimate the channel coefficients in the antenna element space for M<N, for example if side information regarding design of aperture and model for correlation between antenna elements is provided and considered by the radio transceiver device 200. Hence in some embodiments M<N, and the relation in step S106 utilizes correlations between the N antenna elements 160a, ..., 160N.

There could be different ways for the wireless device 200 to obtain the channel conditions for the M beams 110a, 110b, ..., 110M in step S104.

In some aspects the channel conditions for the M beams 110a, 110b, ..., 110M are instantaneous channel conditions. Hence, according to an embodiment the wireless device 200 is configured to perform steps S104a, S104b as part of step S104:

S104a: The wireless device 200 sweeps through the M beams 110a, 110b, ..., 110M, and whilst doing so performs step S104b:

S104b: The wireless device 200 receives the signals in the M beams 110a, 110b, ..., 110M.

If the channel conditions for the M beams 110a, 110b, ..., 110M are instantaneous channel conditions then it could be conditioned that the channel conditions are not only stationary but static. The channel conditions for the N antenna elements 160a, ..., 160N could then be (instantaneous) channel estimates of the radio propagation channel.

The above procedure involving Equations (1) and (2) assumes that the channel coefficients $c_{el}$ are stable during the measurements. If, however, the radio propagation channel between the access node 300a and the radio transceiver device 200 is changing quicker than preferred, a more robust procedure could be used. Hence, in some aspects the channel conditions for the M beams 110a, 110b, ..., 110M are not instantaneous channel conditions. According to an embodiment the channel conditions for the M beams 110a, 110b, ..., 110M are then representative of channel estimations for the M beams 110a, 110b, ..., 110M as averaged over multiple time and/or frequency samples.

In this more robust procedure, instead of using instantaneous channel estimates to find (and apply) appropriate settings for the phase shifters, an averaging of channel estimations over multiple time sample can be used to attain a covariance matrix in the beam space (denoted $R_b$). Then the covariance matrix in the element space (denoted $R_{el}$) can be determined by solving for the parameter $R_{el}$ in the equation:

$$R_b = W R_{el} W^H \quad (5)$$

Then, $R_{el}$ is used to find appropriate phase shifter settings at the radio transceiver device 200, which phase shifter settings are more robust for time varying channel conditions. More strictly, the relation between the covariance matrices in the antenna element space and the beams space is given by:

$$R_{el} = (W W^H)^{-1} W R_b W^H (W W^H)^{-1} \quad (6)$$

In an embodiment also channel estimations from interfering transmitters, such as an interfering access nodes 300b are determined and taken into account when finding the optimal phase shifter settings. Hence, according to an embodiment the wireless radio transceiver device 200 is served by an access node 300a, and the channel conditions for the M beams 110a, 110b, ..., 110M are indicative of the signals as received from the access node 300a as well as interfering signals received from at least one other access node 300b. In such embodiments it is possible to optimize for example the received signal to interference plus noise ratio (SINR) or estimated throughput.

The estimated channel conditions could by the wireless radio transceiver device 200 be used to calculate optimal phase settings of phase shifters. Hence, according to an embodiment each of the N antenna elements 160a, ..., 160N has its own phase shifter (as in FIG. 2), and the beamforming weights determine settings for the phase shifters. The wireless radio transceiver device 200 could then be configured to perform step S108a:

S108a: The wireless radio transceiver device 200 determines updated settings for the phase shifters based on the channel conditions for the N antenna elements 160a, ..., 160N.

Additionally, or alternatively, the estimated channel conditions could by the wireless radio transceiver device 200 be used to calculate optimal settings of amplitude tapers. Hence, according to an embodiment each of the N antenna elements 160a, ..., 160N has its own amplitude taper, and the beamforming weights determine settings for the amplitude tapers. The wireless radio transceiver device 200 could then be configured to perform step S108b:

S108b: The wireless radio transceiver device 200 determines updated settings for the amplitude tapers based on the channel conditions for the N antenna elements 160a, ..., 160N.

According to some aspects the channel conditions for the N antenna elements 160a, ..., 160N are indicative of at least one of SINR of the received signals and channel throughput of the radio propagation channel. The updated settings for the phase shifters and/or the amplitude tapers could then be determined to optimize the SINR and/or the channel throughput.

Figure 5:
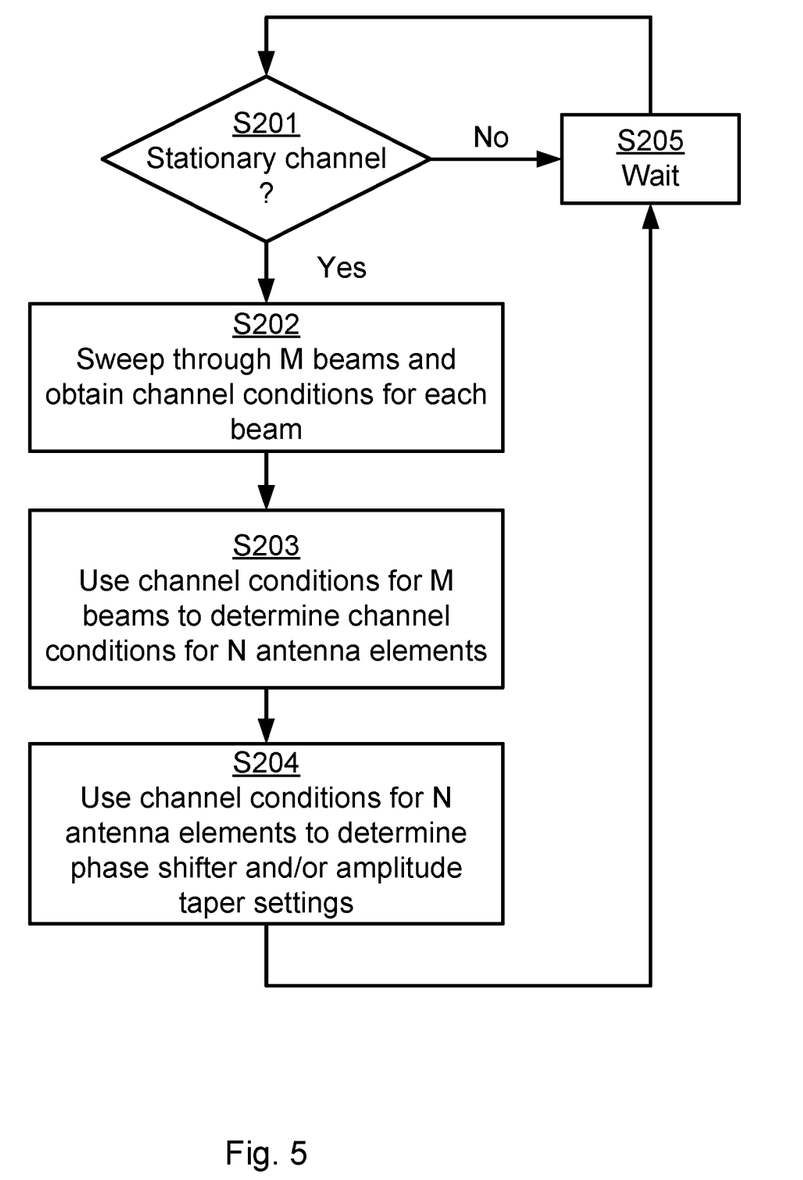

FIG. 5 is a flowchart of a particular embodiment for obtaining channel conditions per antenna element of the wireless radio transceiver device 200 as performed by the radio transceiver device 200 based on at least some of the above disclosed embodiments.

S201: The radio transceiver device 200 evaluates if the radio propagation channel is stationary enough. If the radio propagation is determined to be stationary, step S202 is entered, and else step S205 is entered. One way to implement step S201 is to perform step S102.

S202: The radio transceiver device 200 selects M orthogonal beams 110a, 110b, . . . , 110M. The radio transceiver device 200 then sweeps through these M beams 110a, 110b, . . . , 110M one at a time, and for every beam 110a, 110b, . . . , 110M the radio transceiver device 200 estimates the channel in the beam space. One way to implement step S202 is to perform any of step S104 and S104a.

S203: The radio transceiver device 200, when the channel estimate for all the M beams 110a, 110b, . . . , 110M have been attained, determines the channel estimate for each of the N antenna element 160a, . . . , 160N in the antenna array by using Equation (1) and Equation (2), or Equation (3) and Equation (4), or Equation (5) and Equation (6). One way to implement step S203 is to perform step S106.

S204: The radio transceiver device 200, when the channel estimates for the N antenna elements 160a, . . . , 160N are found, determines an optimal phase setting for each phase shifter and/or optimal settings for each amplitude taper of the analog antenna array in order to optimize some metric, for example received power. One way to implement step S204 is to perform any of step S108a and step S108b.

S205: The radio transceiver device 200 enters a wait state before once again entering step S201. In this way the method can be repeated regularly in order to adapt the phase shifter settings to potential changes for the radio propagation channel and/or the transmit beams at the access node 300a. Alternatively, the method can be repeated if triggered by external information, such as information from a positioning system or a gyro that would indicate that the radio transceiver device 200 has been moved.

In summary, the radio transceiver device 200 in some aspects evaluates if the communication channel is sufficiently stationary, or even static. If so, the radio transceiver device 200 performs downlink measurements on a number of appropriately chosen beams created by an analog beamformer. The radio transceiver device 200 then uses the measurements to calculate a channel estimate on each individual antenna element of the analog antenna array. The radio transceiver device 200 could then use these channel estimates to calculate optimal phase settings of the phase shifters of the analog array with respect to some metric.

Figure 6:
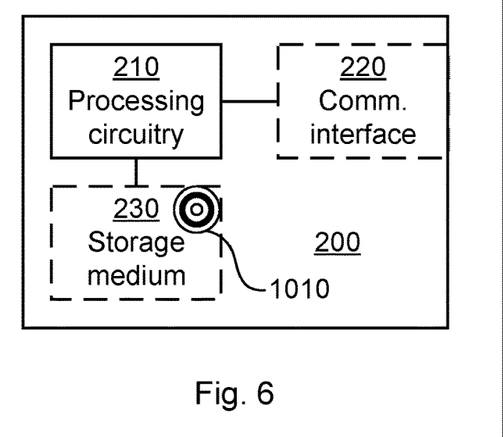
FIG. 6 is a schematic diagram showing functional units of a wireless radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S108b, S201, S205, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with an access node 300a, 300b. As such the communications interface 220 may comprise one or more transmitters and receivers, comprising analogue and digital components. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 7:
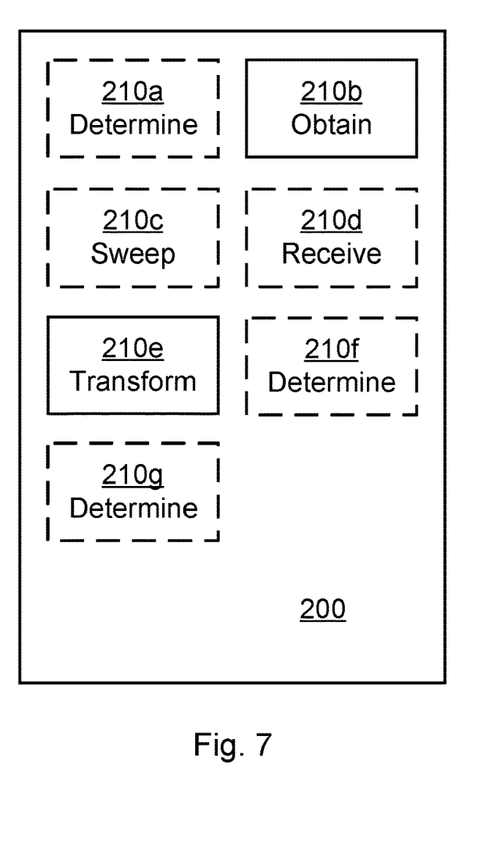
FIG. 7 is a schematic diagram showing functional modules of a wireless radio transceiver device according to an embodiment.

FIG. 7 schematically illustrates, in terms of a number of functional modules, the components of a radio transceiver device 200 according to an embodiment. The radio transceiver device 200 of FIG. 7 comprises a number of functional modules; an obtain module 210b configured to perform step S104, and a transform module 210e configured to perform step S106. The radio transceiver device 200 of FIG. 7 may further comprise a number of optional functional modules, such as any of a determine module 210a configured to perform step S102, a sweep module 210c configured to perform step S104a, a receive module 210d configured to perform step S104b, a determine module 210f configured to perform step S108a, and a determine module 210g configured to perform step S108b. In general terms, each functional module 210a-210g may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

The radio transceiver device 200 may be provided as a standalone device or as a part of at least one further device.

Figure 8:
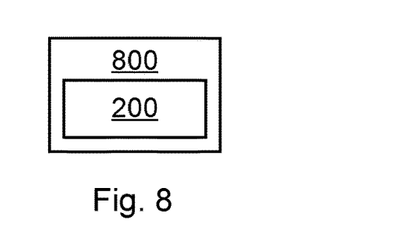
FIG. 8 schematically illustrates an access node according to an embodiment.
Figure 9:
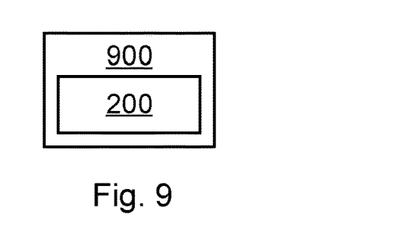
FIG. 9 schematically illustrates a wireless device according to an embodiment.

For example, the radio transceiver device 200 may be implemented in, part of, or co-located with, an access node 800 (as in FIG. 8) or a wireless device 900 (as in FIG. 9). Hence, according to some aspects there is provided an access node 800 and/or wireless device 900 comprising a radio transceiver device 200 as herein disclosed.

Further, a first portion of the instructions performed by the radio transceiver device 200 may be executed in a first device, and a second portion of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 6 the processing circuitry 210 may be distributed among a plurality of devices, or nodes. The same applies to the functional modules 210a-210g of FIG. 7 and the computer program 1020 of FIG. 10 (see below).

Figure 10:
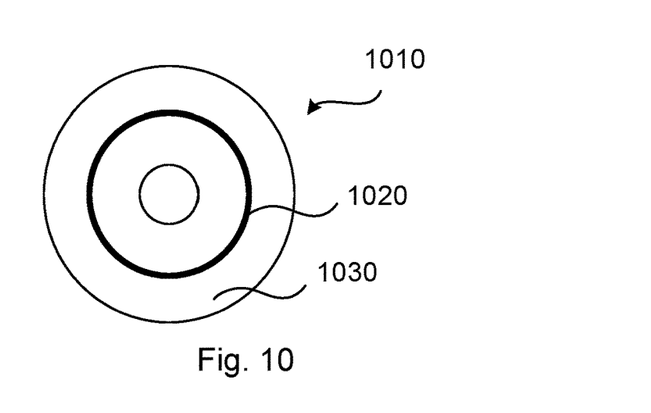
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for obtaining channel conditions per antenna element, the method being performed by a stationary access node comprising N antenna elements in an antenna array with analog beamforming and being configured to communicate via a stationary radio propagation channel utilizing beams, wherein N>1, the method comprising:
  obtaining, for the stationary radio propagation channel, channel conditions for signals received by the stationary access node in M beams, where M>1, wherein the channel conditions comprise M channel estimates; and
  transforming the M channel estimates for the M beams to N channel estimates for the N antenna elements by utilizing a relation based on beamforming weights that map the N antenna elements to the M beams, wherein the N channel estimates are channel estimates of the stationary radio propagation channel.

2. A stationary access node for obtaining channel conditions per antenna element, the stationary access node comprising:
  N antenna elements in an antenna array with analog beamforming, wherein N>1; and
  processing circuitry being configured to cause the stationary access node to:
  communicate via a stationary radio propagation channel utilizing beams;
  obtain, for the stationary radio propagation channel, channel conditions for signals received by the stationary access node in M beams, where M>1, wherein the channel conditions comprise M channel estimates; and
  transform the M channel estimates for the M beams to N channel estimates for the N antenna elements by utilizing a relation based on beamforming weights that map the N antenna elements to the M beams, wherein the N channel estimates are channel estimates of the stationary radio propagation channel.

3. The stationary access node of claim 2, wherein the stationary access node is one of: an access node or a user equipment (UE).

4. The stationary access node of claim 2, wherein the stationary access node is configured to communicate with another stationary access node via the stationary radio propagation channel.

5. The stationary access node of claim 2, wherein MN.

6. The stationary access node of claim 2, wherein M=N, and wherein the M beams are mutually orthogonal with respect to each other.

7. The stationary access node of claim 2, wherein M<N, and wherein the relation specifies correlations between the N antenna elements.

8. The stationary access node of claim 2, wherein the beamforming weights are precoder weights.

9. The stationary access node of claim 8, wherein the relation is defined by a pseudo-inverse of the precoder weights.

10. The stationary access node of claim 2, wherein the relation is defined by a zero-forcing estimator of the channel estimates for the N antenna elements.

11. The stationary access node of claim 2, wherein the relation is defined by a linear minimum mean square error estimator of the channel estimates for the N antenna elements.

12. The stationary access node of claim 2, wherein
  each of the N antenna elements has its own phase shifter,
  the beamforming weights determine settings for the phase shifters, and
  the processing circuitry is further configured to cause the stationary access node to determine updated settings for the phase shifters based on the N channel estimates for the N antenna elements.

13. The stationary access node of claim 2, wherein
  each of the N antenna elements has its own amplitude taper,
  the beamforming weights determine settings for the amplitude tapers, and
  the processing circuitry being configured to further cause the stationary access node to
  determine updated settings for the amplitude tapers based on the N channel estimates for the N antenna elements.

14. The stationary access node of claim 2, wherein the channel estimates for the N antenna elements are indicative of at least one of signal to interference plus noise ratio (SINR) of the received signals, and channel throughput of the stationary radio propagation channel.

15. The stationary access node of claim 2, wherein the stationary access node is served by another stationary access node, and wherein the channel estimates for M beams are indicative of the signals as received from the another stationary access node as well as interfering signals received from at least yet another access node.

16. The stationary access node of claim 2, wherein obtaining the channel estimates for the M beams further comprises:
   sweeping through the M beams, and
   while sweeping through the M beams, receiving the signals in the M beams.

17. The stationary access node of claim 2, wherein the channel estimates for the M beams are representative of channel estimations for the M beams as averaged over multiple time and/or frequency samples.

18. A wireless device comprising a radio transceiver device for obtaining channel estimates per antenna element, the radio transceiver device comprising:
   N antenna elements in an antenna array and being configured to communicate utilizing beams, wherein N>1; and
   processing circuitry being configured to cause the radio transceiver device to:
   obtain for a radio propagation channel, channel conditions for signals received by the radio transceiver device in M beams, where M>1, wherein the channel conditions comprise M channel estimates; and
   transform the M channel estimates for the M beams to N channel estimates for the N antenna elements, wherein the N channel estimates are channel estimates of the radio propagation channel.

19. The wireless device of claim 18, the wireless device is configured to transform the M channel estimates utilizing a relation based on beamforming weights that map the N antenna elements to the M beams.

* * * * *